(12) United States Patent
Bhatia

(10) Patent No.: US 8,149,785 B2
(45) Date of Patent: Apr. 3, 2012

(54) METHODS, SYSTEMS, AND COMPUTER PROGRAM PRODUCTS FOR JUMPING CALLS BETWEEN DIFFERENT MODES OF THE SAME DEVICE

(75) Inventor: Sanjay G. Bhatia, Plano, TX (US)

(73) Assignee: Broadsoft M6, LLC, Gaithersburg, MD (US)

(*) Notice: Subject to any disclaimer, the term of this patent is extended or adjusted under 35 U.S.C. 154(b) by 908 days.

(21) Appl. No.: 11/937,593

(22) Filed: Nov. 9, 2007

(65) Prior Publication Data
US 2008/0119220 A1 May 22, 2008

Related U.S. Application Data

(60) Provisional application No. 60/858,331, filed on Nov. 9, 2006.

(51) Int. Cl.
H04W 4/00 (2009.01)
H04W 36/00 (2009.01)
H04W 40/00 (2009.01)
H04M 1/00 (2006.01)
H04B 1/38 (2006.01)

(52) U.S. Cl. ........ 370/331; 370/338; 370/356; 370/465; 455/436; 455/445; 455/550.1; 455/560

(58) Field of Classification Search ............ 370/331, 370/338, 356, 465; 455/436, 445, 550.1, 455/560
See application file for complete search history.

(56) References Cited

U.S. PATENT DOCUMENTS

| 5,329,578 | A | 7/1994 | Brennan et al. |
| 6,473,612 | B1 | 10/2002 | Cox et al. |
| 6,853,718 | B1 | 2/2005 | Bedingfield et al. |
| 7,092,385 | B2 | 8/2006 | Gallant et al. |
| 7,106,848 | B1 | 9/2006 | Barlow et al. |
| 7,136,651 | B2 * | 11/2006 | Kalavade ............... 455/445 |
| 7,187,923 | B2 * | 3/2007 | Mousseau et al. ........ 455/416 |
| 7,376,112 | B2 * | 5/2008 | Liu ....................... 370/338 |
| 7,526,313 | B2 * | 4/2009 | Mousseau et al. ...... 455/552.1 |
| 7,646,777 | B2 * | 1/2010 | Hicks et al. ............. 370/401 |

(Continued)

FOREIGN PATENT DOCUMENTS

EP  0 700 227 A2 * 3/1996

(Continued)

OTHER PUBLICATIONS

Notification of Transmittal of the International Search Report and the Written Opinion of the International Searching Authority, or the Declaration for International Application No. PCT/US07/23643 (Mar. 14, 2008).

(Continued)

Primary Examiner — Alpus H Hsu
(74) Attorney, Agent, or Firm — Jenkins, Wilson, Taylor & Hunt, P.A.

(57) ABSTRACT

Methods, systems, and computer program products for jumping a call between modes of the same device are disclosed. According to one method, a call is established between a first mode of a calling device and a call device. An indication is received to jump the call to a second mode of the calling device. In response to the indication, the call is jumped to a second mode of the calling device such that the call continues between the second mode of the calling device and the called device.

11 Claims, 5 Drawing Sheets

U.S. PATENT DOCUMENTS

| | | | |
|---|---|---|---|
| 7,738,644 | B2 | 6/2010 | Brannick et al. |
| 7,818,008 | B2 * | 10/2010 | Kalavade .................... 455/445 |
| 7,953,032 | B2 * | 5/2011 | Liang ......................... 370/311 |
| 7,983,676 | B2 * | 7/2011 | Ju et al. ...................... 455/439 |
| 2005/0083948 | A1 | 4/2005 | Hiroshima et al. |
| 2006/0229101 | A1 | 10/2006 | LaBauve et al. |
| 2006/0286984 | A1 * | 12/2006 | Bonner ...................... 455/445 |
| 2007/0116234 | A1 | 5/2007 | Schneider et al. |
| 2007/0263609 | A1 * | 11/2007 | Mitchell .................... 370/356 |
| 2007/0263610 | A1 * | 11/2007 | Mitchell .................... 370/356 |
| 2007/0263611 | A1 * | 11/2007 | Mitchell .................... 370/356 |
| 2007/0281680 | A1 * | 12/2007 | Raju et al. ................. 455/422.1 |

FOREIGN PATENT DOCUMENTS

WO    WO 2008/030514  A2    3/2008

OTHER PUBLICATIONS

Commonly-assigned, co-pending U.S. Appl. No. 12/950,641 for "Methods, Systems, and Computer Readable Media for Unifying Fixed and Mobile Devices via Third Party Call Control," (Unpublished, filed Nov. 19, 2010).

Notice of Allowance and Fee(s) Due for U.S. Appl. No. 11/899,412 (Jan. 28, 2010).

Communication of European Publication Number and Information on the Application of Article 67(3) EPC for European Patent No. 2137947 (Dec. 2, 2009).

Non-Final Official Action for U.S. Appl. No. 11/899,412 (Aug. 11, 2009).

Communication of European publication Number and information on the application of Article 67(3) EPC for European Patent No. 2067346 (May 13, 2009).

Final Official Action for U.S. Appl. No. 11/899,412 (Mar. 24, 2009).

Interview Summary for U.S. Appl. No. 11/899,412 (Dec. 23, 2008).

Notification of Transmittal of the International Search Report and the Written Opinion of the International Searching Authority, or the Declaration for International Application No. PCT/US07/19436 (Jul. 25, 2008).

Non-Final Official Action for U.S. Appl. No. 11/899,412 (Jul. 22, 2008).

Camarillo et al, "Update to the Session Initiation Protocol (SIP) Preconditions Framework," RFC 4032, pp. 1-10 (Mar. 2005).

Rosenberg et al., "Best Current Practices for Third Party Call Control (3pcc) in the Session Initiation Protocol," RFC 3725 (Apr. 2004).

Camarillo et al., "Integration of Resource Management and SIP," RFC 3312, pp. 1-24 (Oct. 2002).

Rosenberg et al., "SIP: Session Initiation Protocol," RFC 3261, pp. 1-269 (Jun. 2002).

* cited by examiner

METHODS, SYSTEMS, AND COMPUTER PROGRAM PRODUCTS FOR JUMPING CALLS BETWEEN DIFFERENT MODES OF THE SAME DEVICE

RELATED APPLICATIONS

The presently disclosed subject matter claims the benefit of U.S. Provisional Patent Application Ser. No. 60/858,331, filed Nov. 9, 2006; the disclosure of which is incorporated herein by reference in its entirety.

TECHNICAL FIELD

The subject matter described herein relates to jumping in progress calls to predetermined destinations. More particularly, the subject matter described herein relates to jumping calls between different modes of the same device.

BACKGROUND

Call jumping is a feature that allows a user to jump a call in progress to a user selected destination. For example, a user may desire to jump a call that began on the user's office phone to the user's cellular phone in order to continue the call on the user's cellular phone. In addition to jumping calls between devices, it may be desirable to jump calls between modes of the same device. For example, a subscriber may have a dual mode device with cellular and Wi-Fi communications capabilities. It may be desirable to jump from the cellular mode of the device to the Wi-Fi mode of the device or vice versa. Although roaming between cellular and Wi-Fi networks is known, call jumping between different modes of the same device is not believed to be known or provided by current implementations. Accordingly, there exists a need for methods, systems, and computer program products for jumping calls between different modes of the same device.

SUMMARY

The subject matter described herein includes methods, systems, and computer program products for jumping calls between different modes of the same device. According to one method, a call is established between a first mode of a calling device and a called device. An indication to jump a call to a second mode of the calling device is received. In response to the indication, the call is jumped to the second mode of the device.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be located on a single device or computing platform or may be distributed across multiple devices or computing platforms.

DETAILED DESCRIPTION

The subject matter described herein includes methods, systems, and computer program products for jumping calls between different modes of the same device. For example, a device may have cellular and Wi-Fi capabilities, and it may be desirable to jump an in progress call from the cellular mode of the device to the Wi-Fi mode of the device or vice versa. In one implementation, such a device may have a first directory number corresponding to its cellular mode that is provisioned at a home location register (HLR). This number may be a number known to the wireless network to contact the cellular capability of the device, but may not be a public number that other users dial. The device may have another number corresponding to its Wi-Fi or IP phone mode. This number may be the public number that other users use to contact the device. This number may be provisioned at a voice over IP application server, along with the cellular number.

Another implementation detail of the subject matter described herein is that call control may be provided on the IP or application server side of the network, rather than the cellular side of the network in order to allow application server features to be provided. Yet another aspect of the subject matter described herein is that device with multiple modes of communication may have a converged client that keeps track of modes of communication available to the device.

Figure 1:
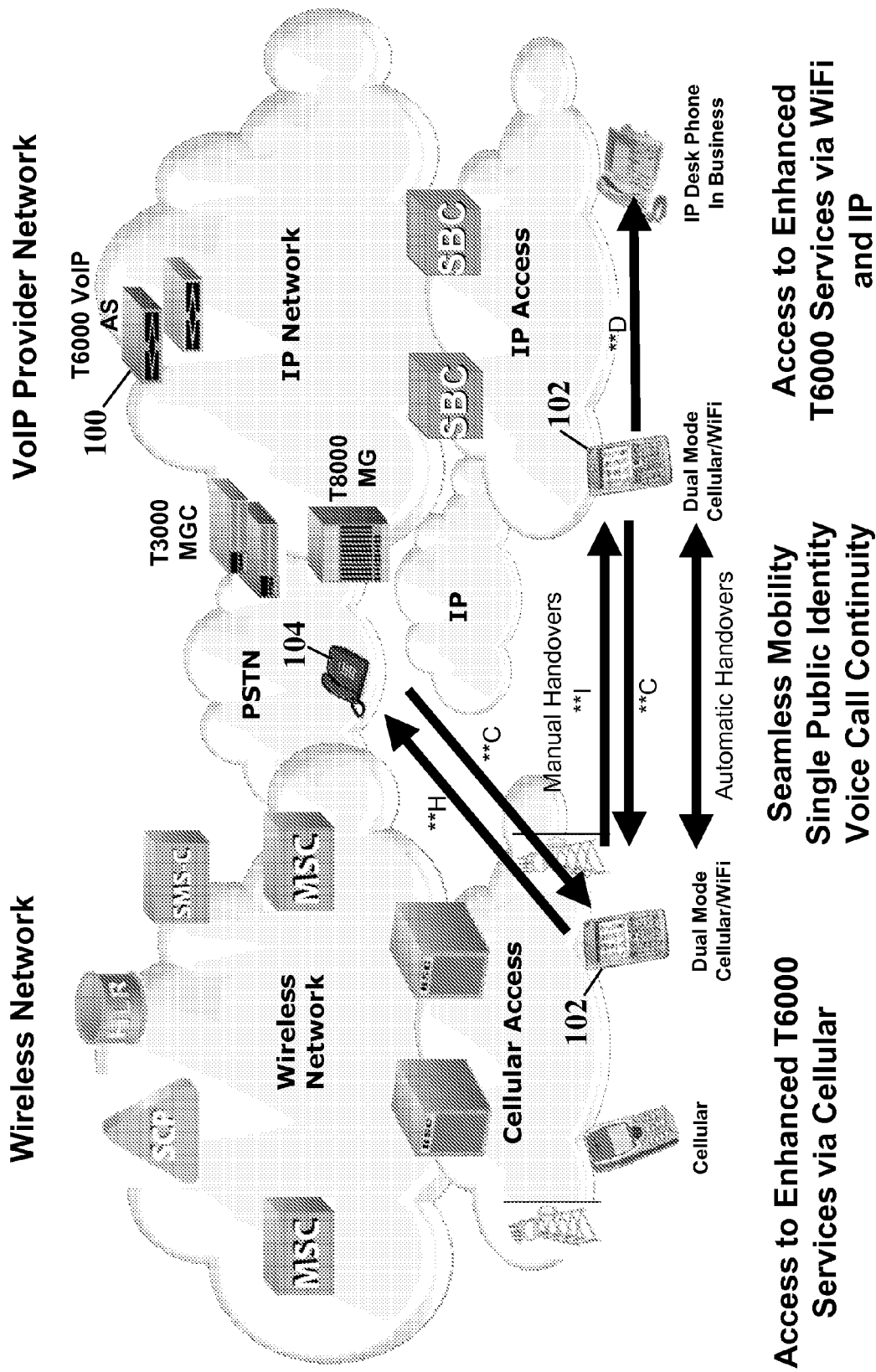
FIG. 1 is a network diagram illustrating an exemplary network in which calls may be jumped between different modes of the same device according to an embodiment of the subject matter described herein.

FIG. 1 is a network diagram illustrating exemplary components for providing call jumps between different modes of the same device. In FIG. 1, an application server 100 resides in the IP network. Application server 100 may have both the public IP and cellular numbers of a dual mode device 102 provision. Device 102 is shown in two locations in FIG. 1. However, in this example, it is assumed that device 102 is a single device with two modes of communication—cellular and Wi-Fi communications.

In this example, it is assumed that device 102 has an existing call in progress with another phone, such as PSTN phone 104. In one example, the initial call may be a call to the Wi-Fi mode or device 102. From this mode, the user of device 102 may desire to initiate a handover to the cellular mode of device 102. This initiation may be triggered manually by the user by dialing predetermined dual tone multi-frequency (DTMF) digits, such as C. Once this occurs, the DTMF digits will be communicated to application server 100. Application server 100 will signal with the cellular mode of device 102 to establish a media connection between the cellular mode of device 102 and called phone 104, and thereby jump the call to called phone 104. Once the new media connection is established, the media connection with the Wi-Fi mode of device 102** may be disabled.

In another example, the initial call between device 102 and phone 104 may be initiated between the cellular mode of device 102 and phone 104. The user of device 102 may dial predetermined DTM F digits, such as **\*\*I to jump the call to the Wi-Fi mode of device 102. The DTMF digits \*\*I may be communicated to application server 100. Application server 100 may then signal with the Wi-Fi mode of device 102 to establish a media connection between the Wi-Fi mode of device 102 and phone 104, and thereby jump the call to the Wi-Fi mode of device 104**.

In another example, it may be desirable to automatically jump the call between the modes of device 102. An automatic call jump may be initiated when the signal strength in one mode of communication falls below a threshold and the signal strength in the other mode of communication is above a predetermined threshold. For example, if the initial call is between the cellular mode of device 102 and phone 104, and the phone moves to an area where cellular access is poor and Wi-Fi access is good, the Wi-Fi mode of device 102 may send a call initiation request to a special number corresponding to application server 100. Application server 100 will recognize the call initiation request as a handover request from the Wi-Fi mode. Application server 100 may then signal with the Wi-Fi mode of phone 102 to establish media connection between the Wi-Fi mode of phone 102 and phone 104, thereby jumping the call to the Wi-Fi mode of phone 102.

Figure 2:
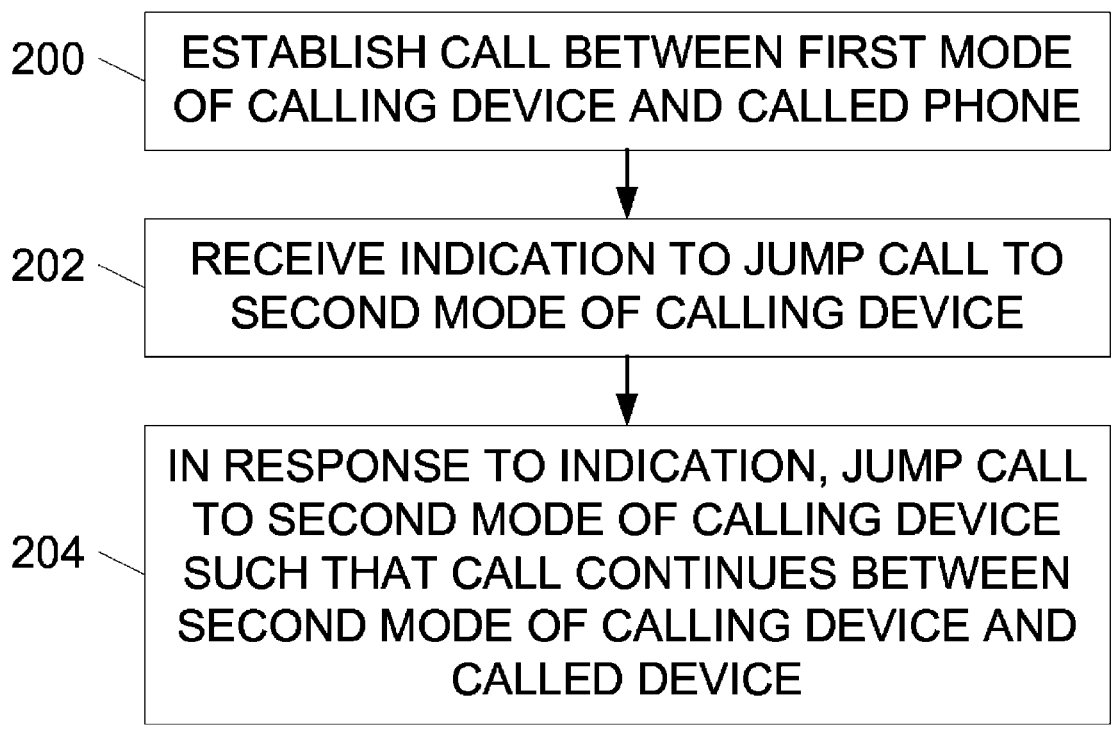
FIG. 2 is a flow chart illustrating an exemplary process for jumping calls between different modes of the same device according to an embodiment of the subject matter described herein.

FIG. 2 is a flow chart illustrating exemplary overall steps for jumping a call between different modes of the same device. Referring to FIG. 2, in step 200, a call is established between a first mode of a calling device and a called phone. In step 202, an indication is received to jump the call to a second mode of the calling device. In step 204, in response to the indication, the call is jumped to the second mode of the calling device such that the call continues between the second mode of the calling device and the called device.

Figure 3:
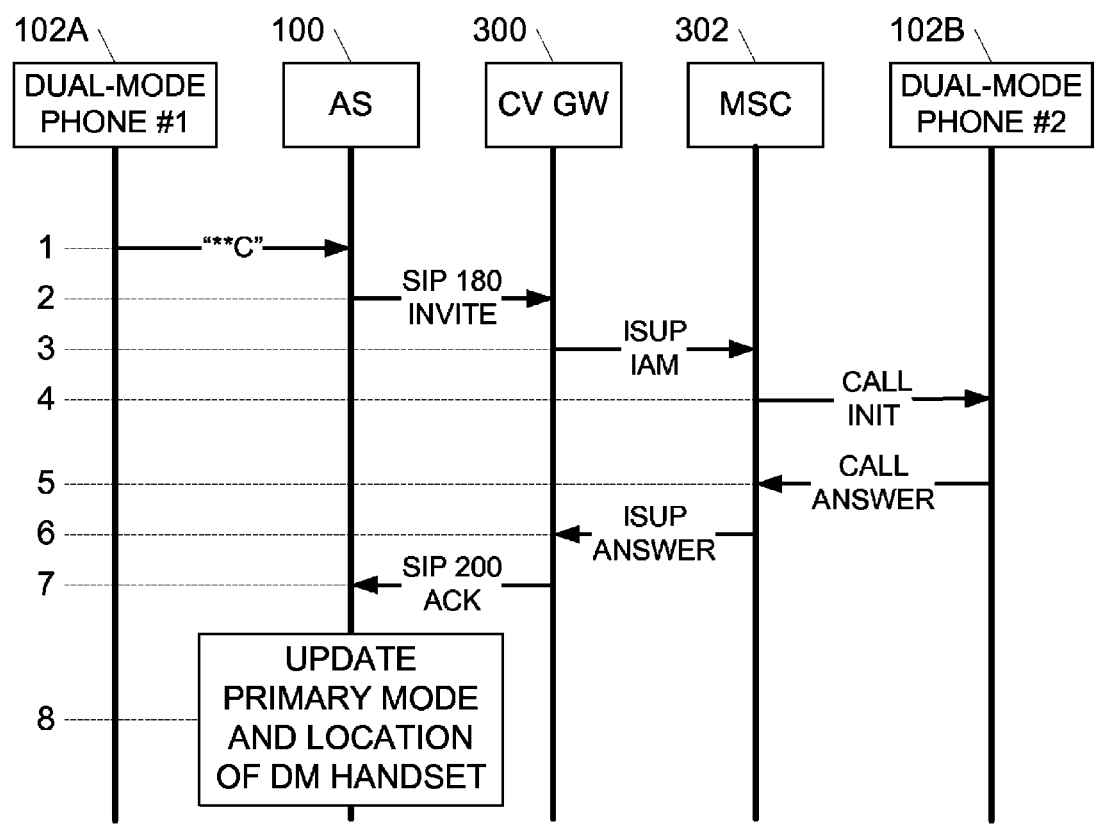
FIG. 3 is a call flow diagram illustrating exemplary signaling messages for manually jumping calls between different modes of the same device according to an embodiment of the subject matter described herein.

FIG. 3 is a call flow diagram illustrating exemplary messages exchanged in manually implementing a jump between different modes of the same device. In FIG. 3, a dual mode device is represented by reference numbers 102A and 102B, corresponding to different modes of the dual mode device. In the example illustrated in FIG. 3, mode 102A is accessible by dual mode phone number 1 and mode 102B is accessible by dual mode phone number 2. Initially, it is assumed that there is a call in progress between mode 102A and a call device, which is not illustrated in FIG. 3.

In line 1 of the call flow diagram, mode 102A sends the digits **\*\*C to application server 100. In line 2, application server 100 sends a SIP INVITE message to a convergence gateway 300. Convergence gateway 300 converts the SIP INVITE message into an ISUP IAM message and sends the message to MSC 302. In line 4, MSC 302 sends a call initiation message to mode 102B of the device. A client on the device may recognize the call initiation request as a request for a handover and, rather than ringing the subscriber, may indicate to the subscriber on a display that a call jump to mode 102B is being requested. If the subscriber accepts the call jump request, a call answered indication may be communicated to MSC 302, as indicated in line 5 of the call flow diagram. In line 6, MSC 302 sends an ISUP answer message to gateway 300. In line 7, gateway 300 sends a SIP 200 OK message to application server 100. In line 8, application server 100 updates the primary mode and location of the handset. After line 8, the call has been jumped to mode 102B** of the calling device and the called device.

Figure 4:
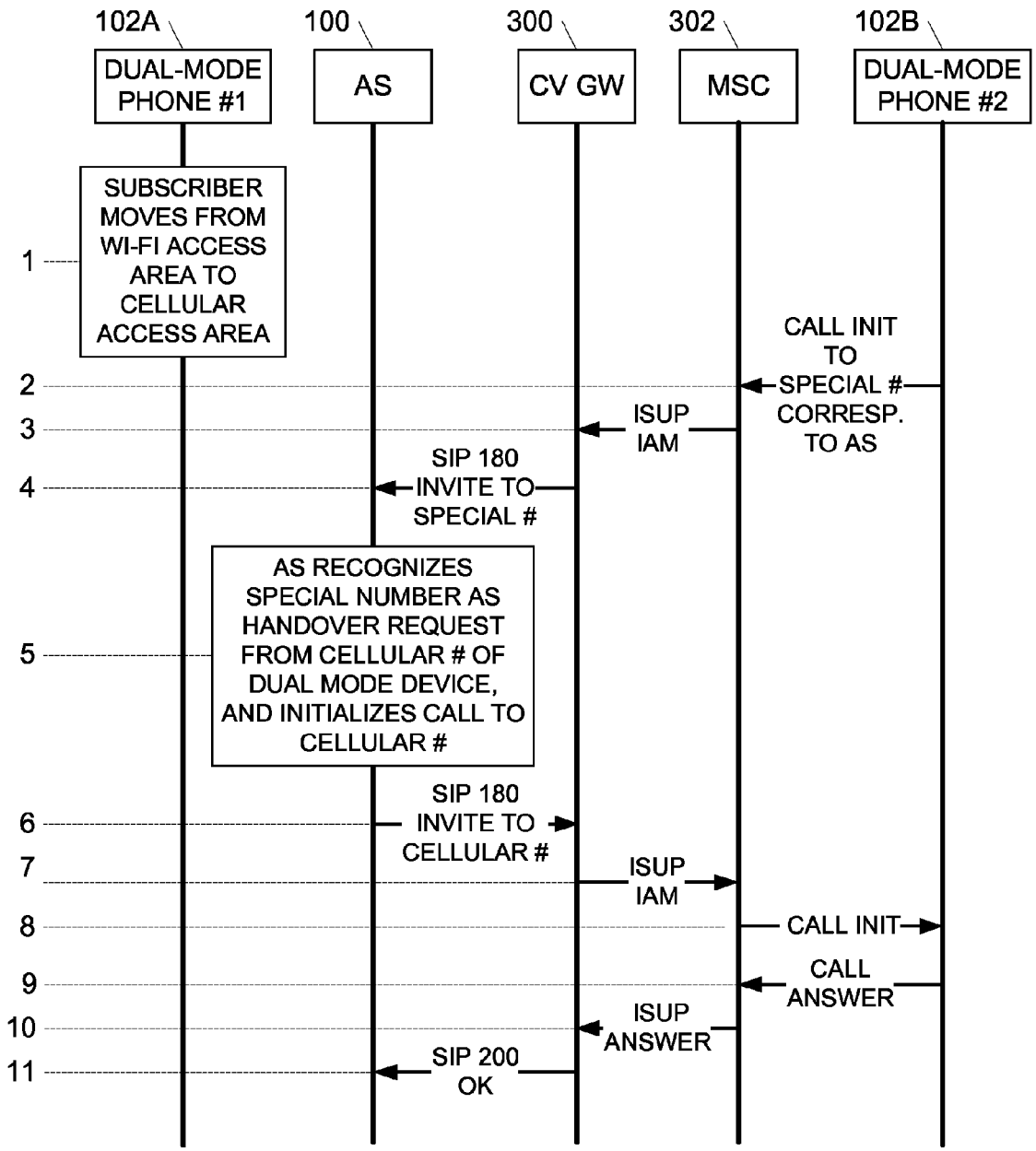
FIG. 4 is a flow diagram illustrating exemplary signaling messages for automatically jumping calls between different modes of the same device according to an embodiment of the subject matter described herein.

FIG. 4 is a flow diagram illustrating exemplary signaling messages associated with an automatically triggered call jump between modes of the same device. Referring to FIG. 4, in line 1, the subscriber moves from a Wi-Fi access area to a cellular access area. In line 2, the cellular mode of the device initiates a call to a special number corresponding to the application server. In line 3, MSC 302 sends an ISUP IAM message to convergence gateway 300. In line 4, convergence gateway 300 sends an INVITE message to application server 100. In line 5, application server 100 recognizes the INVITE message as a call from a special number requesting a handover from the calling number corresponding to the cellular mode of the device. In line 6, application server 100 sends an INVITE message to the cellular number of the device. In line 7, convergence gateway 300 converts the INVITE message into an ISUP IAM message. In line 8, MSC 302 sends a call initiation message to the cellular mode of the device. If the device accepts the handover, in line 9, an answer message is communicated to MSC 302. In line 10, MSC 302 converts the answer message into an ISUP answer message. In line 11, convergence gateway 300 sends a 200 OK message to application server 100. After line 11, the call has been automatically jumped to the cellular mode of the device.

Figure 5:
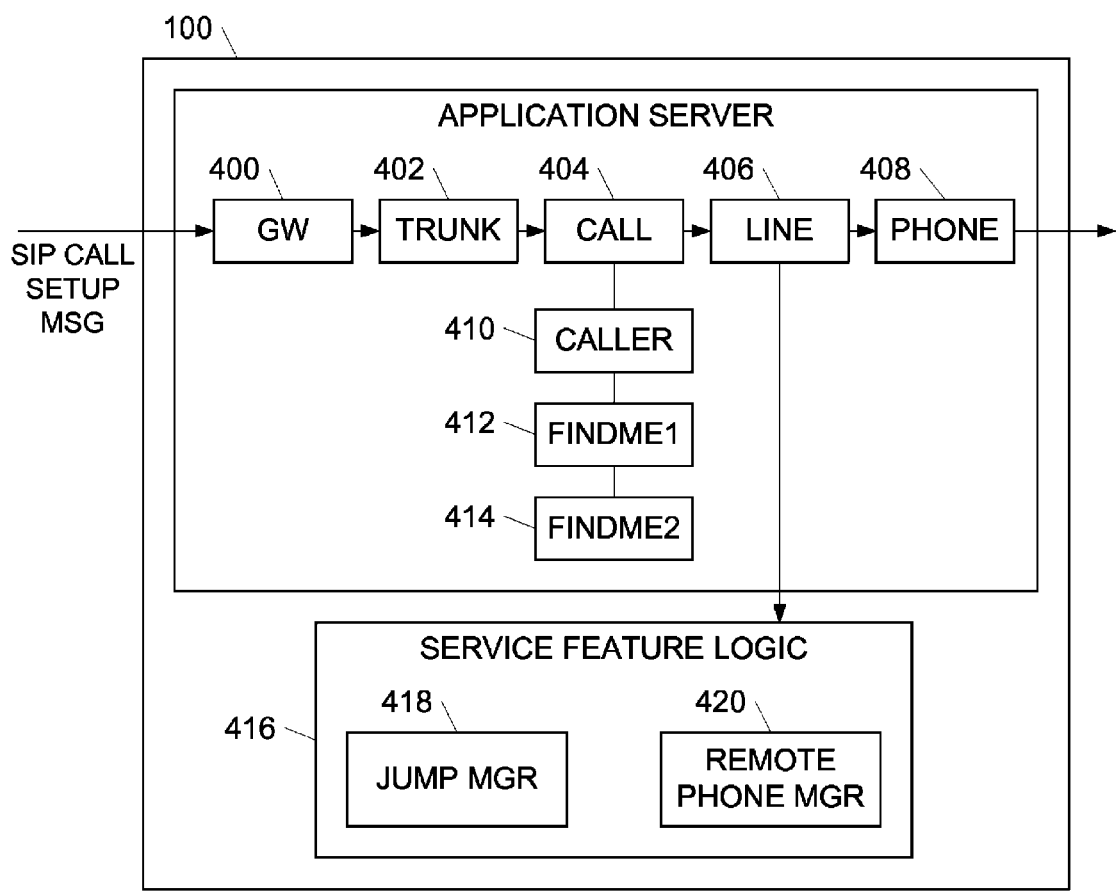
FIG. 5 is a block diagram illustrating exemplary components of a VoIP application server for jumping calls between different modes of the same device according to an embodiment of the subject matter described herein.

FIG. 5 is a block diagram illustrating exemplary components of application server 100 for implementing call jumps between modes of the same device according to an embodiment of the subject matter described herein. Referring to FIG. 5, voice over IP application server includes a plurality of components 400-414 that correspond to actual telecommunications network elements. For example, a gateway component 400 may perform gateway functionality, such as conversion between SIP and another form of signaling, such as SS7. Trunk component 402 may correspond to aspects of a physical trunk. Call component 404 may store attributes of a call in progress. For example, call component 404 may maintain call state information. Line component 406 may be implemented on a per subscriber basis and store attributes of a subscriber's line. Phone component 408 may store information about a subscriber's phone, such as the phone's media capabilities and contact information. Caller component 410 may store attributes about an incoming caller. Find me components 412 and 414 may implement find me service, such as simultaneously or sequentially ringing phones of a subscriber.

Voice over IP application server 100 also includes services feature logic 416 for implementing advanced features, such as call jumping. In the illustrated example, services feature logic 416 includes a jump manager 418 for initiating call jumps between different modes of the same device. A remote phone manager 420 may implement the remote phone feature that allows one mode of a phone to masquerade as another mode of the phone such that the remote phone can access features provided by VoIP application server for the phone being imitated.

In operation, when an incoming call arrives at phone component 408, the incoming call event is passed to line component 406. Line component 406 presents the event to service feature logic 416. Service feature logic 416 analyzes the event for DTMF or other codes indicating a call jump or other features. In this example, it is assumed that the requested feature is a call jump. Accordingly, jump manager 418 creates a jump call and initiates signaling to jump the call to the new destination.

According to another aspect of the subject matter described herein, the remote phone feature may be used to provide application-server-provided features to all modes of a multi-mode device. As described above, the remote phone feature allows one device to masquerade as another device. For example, a subscriber may provision his cellular phone as a remote phone for his office phone in application server 100 so that the cellular phone will have all of the features of the office phone. According to an aspect of the subject matter described herein, the remote phone feature may be used to provide similar capabilities between different modes of the same device.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for jumping a call between modes of a same device, the method comprising:
    at a voice over IP application server:
    (a) establishing a call between a first mode of a calling device and a called device;
    (b) receiving an indication to jump the call to a second mode of the calling device; and
    (c) in response to the indication, jumping the call to the second mode of the calling device such that the call continues between the second mode of the calling device and the called device, wherein the second mode of the calling device functions as a remote phone for the calling device to allow access to features provided to the first mode of the calling device, wherein functioning as a remote phone includes providing at least one service feature associated with the first mode to the calling device when the calling device is communicating via the second mode and not simultaneously communicating via the first mode such that the second mode of the calling device can access the at least one service feature of the first mode of the calling device without the calling device simultaneously communicating via the first mode.

2. The method of claim 1 wherein the first mode comprises a cellular mode and the second mode comprises a Wi-Fi mode.

3. The method of claim 1 wherein the first mode comprises a Wi-Fi mode and the second mode comprises a cellular mode.

4. The method of claim 1 wherein receiving an indication includes receiving predetermined dual tone multi-frequency (DTMF) digits from the calling device.

5. The method of claim 1 wherein receiving an indication includes automatically receiving an indication from the second mode of the calling device.

6. A system for jumping a call between modes of a same device, the system comprising:
    a voice over IP application server including:
    (a) a line component for receiving an indication to jump an in-progress call from a first mode of a calling device to a second mode of the calling device;
    (b) a jump manager for, in response to the indication, for jumping the call to the second mode of the calling device such that the call continues between the second mode of the calling device and a called device; and
    (c) a remote phone manager for provisioning the second mode of the calling device as a remote phone for the first mode, wherein provisioning as a remote device includes providing at least one service feature associated with the first mode to the calling device when the calling device is communicating via the second mode and not simultaneously communicating via the first mode such that the second mode of the calling device can access the at least one service feature of the first mode of the calling device without the calling device simultaneously communicating via the first mode.

7. The system of claim 6 wherein the first mode comprises a cellular mode and the second mode comprises a Wi-Fi mode.

8. The system of claim 6 wherein the first mode comprises a Wi-Fi mode and the second mode comprises a cellular mode.

9. The system of claim 6 wherein the indication includes predetermined dual tone multi-frequency (DTMF) digits received from a user of the calling device.

10. The system of claim 6 wherein the indication includes an indication that is automatically generated by the calling device.

11. A non-transitory computer readable medium having stored thereon a computer program for jumping a call between different modes of a same device, the computer program including instructions, when executed by a processor/computer, for performing steps comprising:
    at a voice over IP application server:
    (a) establishing a call between a first mode of a calling device and a called device;
    (b) receiving an indication to jump the call to a second mode of the calling device; and
    (c) in response to the indication, jumping the call to the second mode of the calling device such that the call continues between the second mode of the calling device and the called device, wherein the second mode of the calling device functions as a remote phone for the calling device to allow access to features provided to the first mode of the calling device, wherein functioning as a remote phone includes providing at least one service feature associated with the first mode to the calling device when the calling device is communicating via the second mode and not simultaneously communicating via the first mode such that the second mode of the calling device can access the at least one service feature of the first mode of the calling device without the calling device simultaneously communicating via the first mode.

* * * * *